United States Patent [19]

Trepka

[11] 3,931,107

[45] Jan. 6, 1976

[54] POLYALKOXY MONOVINYLAROMATIC COMPOUND IN COPOLYMERIZATION OF A CONJUGATED DIENE WITH A MONOVINYL-SUBSTITUTED AROMATIC COMPOUND

[75] Inventor: William J. Trepka, Bartlesville, Okla.

[73] Assignee: Phillips Petroleum Company, Bartlesville, Okla.

[22] Filed: June 21, 1973

[21] Appl. No.: 372,240

[52] U.S. Cl. ......... 260/47 UA; 260/80.7; 260/80.76; 260/83.7
[51] Int. Cl.² ...................................... C08F 236/04
[58] Field of Search ............ 260/83.7, 47 UA, 80.7, 260/80.76

[56] References Cited

UNITED STATES PATENTS

| | | | |
|---|---|---|---|
| 3,410,836 | 11/1968 | Hsieh et al. | 260/83.7 |
| 3,725,368 | 4/1973 | Morrison et al. | 260/84.7 |

*Primary Examiner*—Lester L. Lee

[57] ABSTRACT

Polyalkoxy monovinyl substituted aromatic compounds, such as 3,4-dimethoxystyrene, function as both comonomer and randomizing agent in organolithium initiated copolymerization of a conjugated diene with a monovinyl aromatic compound, such as of butadiene with styrene. The resultant polymeric product exhibits lower levels of block styrene than does a corresponding copolymer made in the absence of the dimethoxystyrene.

35 Claims, No Drawings

POLYALKOXY MONOVINYLAROMATIC COMPOUND IN COPOLYMERIZATION OF A CONJUGATED DIENE WITH A MONOVINYL-SUBSTITUTED AROMATIC COMPOUND

FIELD OF THE INVENTION

The invention relates to copolymerization processes of a conjugated diene with a monovinyl-substituted aromatic compound. The invention also relates to copolymers of a conjugated diene with a monovinyl-substituted aromatic compound. The invention further relates to polymerization initiators.

BACKGROUND OF THE INVENTION

Many methods are known for the preparation of "random" copolymers of a conjugated diene with a monovinyl-substituted aromatic compound. A typical method employs a hydrocarbyllithium initiator with a polar organic compound as randomizing agent. Randomization effects vary to some extent. Usually, the random copolymer contains some block polystyrene. Monomethoxystyrenes are known to copolymerize with a conjugated diene. U.S. Pat. No. 3,177,190 discloses copolymerization of a monomethoxystyrene or monomethoxyvinylnaphthalene compound to form block copolymers. However, monomethoxystyrenes do not exhibit randomizing properties.

OBJECTS OF THE INVENTION

An object of the invention is to provide a new method of copolymerization of a conjugated diene with a monovinyl-substituted aromatic compound. Another object of the invention is to provide random copolymerization of a conjugated diene with a monovinyl-substituted aromatic compound with minimization of formation of block polystyrene in the copolymer. A still further object is to provide new types of conjugated diene/monovinyl-substituted aromatic compound copolymers. An even further object is the preparation of novel polymerization initiators.

Other objects, aspects, and advantages of the invention will be apparent from a study of the specification and the appended claims.

BRIEF SUMMARY OF THE INVENTION

I have discovered that polyalkoxy monovinyl-substituted aromatic compounds, in which at least two alkoxy groups are adjacent on the aromatic ring, function both as comonomer and as effective randomizing agent in the copolymerization of a conjugated diene, such as butadiene, with a monovinyl-substituted aromatic comonomer, such as styrene.

The process is convenient, and a simplification in that it is possible to obtain efficient randomization with my polyalkoxy monovinyl-substituted aromatic compounds which also act as comonomers. The resultant product is a random copolymer of the conjugated diene/monovinyl-substituted aromatic type yet possessing alkoxyl groups located on a portion of the aromatic rings pendant to the polymer carbon-carbon backbone. These alkoxyl groups in the polymer confer a mild yet quite desirable degree of polarity, with attendant potential for improved incorporation of dyes, fillers, pigments, plasticizers, and the like. Furthermore, the presence of such alkoxyl groups offers wide opportunity to the polymer chemist for various other derivative products, such as alkoxyl cleavage reactions to obtain aromatic hydroxyl groups within the copolymers. This opens wide vistas to the polymer chemist since a variety of reactions can significantly influence polymer properties, yet without requiring the presence of many alkoxyl groups, per polymer molecule.

DETAILED DESCRIPTION OF THE INVENTION

According to my invention, a polyalkoxy monovinyl-substituted aromatic hydrocarbon is employed as both comonomer and randomizer in the copolymerization of a polymerizable conjugated diene monomer with a copolymerizable monovinyl-substituted aromatic compound monomer, with the polymerization conducted under polymerization conditions and employing an organolithium initiator.

POLYALKOXY MONOVINYL-SUBSTITUTED AROMATIC RANDOMIZER-MONOMER

The combination randomizer-comonomer polyalkoxy monovinyl-substituted aromatic compounds employed in the process of this invention contain at least two alkoxy groups and one vinyl group on a benzene ring nucleus, with at least two alkoxy groups adjacent or ortho to each other. Further alkoxy or other substituents can be present on the ring. These reagents also can be described by the formula:

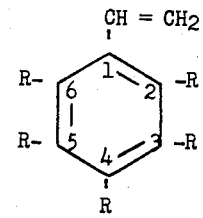

wherein each R can be hydrogen, alkoxyl —OR', hydrocarbyl, or halogen, with the proviso that at least two of the R groups are —OR' and are located on adjacent ring positions, more preferably at ring positions 3 and 4. The halogen can be fluorine or chlorine. Each R group, where hydrocarbyl, can be linear or branched alkyl, cycloalkyl, aryl, or aralkyl, of up to 7 carbon atoms, preferably of up to 6 carbon atoms per R group, and wherein two adjacent R groups including the carbon atoms of the aromatic nucleus can form a 5 to 10 membered ring system. R' can be linear or branched alkyl, and while not limited specifically in size as to operability, presently preferably contains up to 6 carbon atoms per R' group. The total number of carbon atoms in my polyalkoxy monovinyl aromatic compound is not limited in carbon number by operability, but merely as a matter of convenience and solubility in the reaction environment. Presently, I prefer the total number of carbon atoms in the molecule not to exceed 20.

Exemplary of my combination randomizer-monomer compounds, my polyalkoxy monovinyl-substituted aromatic comonomers, are 3,4-dimethoxystyrene which is presently preferred, as well as 3,4-diethoxy-5-methylstyrene, 3,4-dimethoxy-5-cyclohexylstyrene, 3,4-dimethoxy-5-(1,3-dimethylbutyl)styrene, 3,4-di-(n-propoxy)-5-fluorostyrene, 3-vinyl-5,6-dimethoxybiphenyl, 1-vinyl-3,4-dimethoxy-5-ethyl-6-chloro-7-fluoronaphthalene, 3,4,5-triethoxystyrene, pentamethoxystyrene, 3,4-dimethoxy-5-(p-tolyl)styrene, and the like, alone or in admixture.

In the process of my invention, I employ at least one monomer which is a polymerizable conjugated diene and a polymerizable comonomer which is at least one monovinyl-substituted aromatic hydrocarbon. Any of the polymerizable conjugated dienes copolymerizable with a monovinyl-substituted aromatic compound can be employed. For convenience, commercial availability, and the like, I presently prefer the polymerizable conjugated dienes of 4 to 12 carbon atoms per molecule, and for similar reasons, the monovinyl-substituted aromatic hydrocarbons of 8 to 20 carbon atoms per molecule. More preferred are the conjugated dienes of 4 to 8 carbon atoms per molecule, and the monovinyl substituted aromatic hydrocarbons of 8 to 12 carbon atoms per molecule.

In the copolymerization process, at least one polymerizable conjugated diene is copolymerized with at least one copolymerizable monovinyl-substituted aromatic compound, in any ratio. The two types of monomers preferably are copolymerized in a weight ratio of about 5:95 to 95:5, more preferably 40:60 to 90:10.

Exemplary of the polymerizable conjugated dienes I prefer are 1,3-butadiene and isoprene as well as 2,3-dimethyl-1,3-butadiene, piperylene, 3-butyl-1,3-octadiene, 2-phenyl-1,3-butadiene, and the like, alone or in admixture.

Exemplary monovinyl-substituted aromatic compounds include the presently preferred styrene, as well as 1-vinylnaphthalene, 2-vinylnaphthalene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like, alone or in admixture.

initiators

Any of the known organolithium compounds, as such as well as adducts, and the like, known for the polymerization of conjugated dienes and copolymerization of a conjugated diene with a monovinyl-substituted aromatic compound can be employed in the process of my invention. Preferred are the hydrocarbyllithium compounds and adducts. Presently preferred are the organolithium compounds represented by $R''Li_x$ wherein $R''$ represents a hydrocarbon radical which can be aliphatic, cycloaliphatic, aromatic, or combination thereof, Li is lithium, and $x$ is an integer of 1 to 4, inclusive. The $R''$ in the formula, the hydrocarbon radical, with a valence of $x$, can range widely in size as far as the number of carbon atoms contained therein is concerned, and is not limited by operability. For convenience and availability, I prefer those organolithium compounds containing a hydrocarbon $R''$ radical of up to 20 carbon atoms.

Examples of some of these organolithium initiators include methyllithium, isopropyllithium, butyllithium, t-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, and 1,2,3,5-tetralithio-4-hexylanthracene, and the like, alone or in admixture.

POLYMERIZATION PROCESS

In the process of copolymerization according to my invention, the monomers, the initiator, and my randomizer are introduced into the reaction zone in any convenient order, and usually and preferably further in the presence of a diluent.

The amount of initiator employed appears not to be critical in the process of the invention, and any of the ranges known in the copolymerization art for conjugated dienes and monovinyl-substituted aromatic compounds can be employed. As exemplary, I consider a range of about 0.01 to 1 part by weight organolithium initiator to 100 parts by weight total monomer other than randomizer.

The amount of the polyalkoxy monovinyl-substituted aromatic compound combination randomizer monomer can range widely, so long as a sufficient amount is employed to provide the desired randomizing effect. I presently prefer a range of about 0.01 to 10, more preferably about 0.1 to 1, parts of randomizer by weight per 100 parts by weight of total monomer other than the randomizer itself.

The polyalkoxy monovinyl aromatic compound can be introduced into the polymerization zone in any convenient manner, alone or in admixture with other components. In one aspect, my randomizer can be reacted with the hydrocarbon lithium initiator, preferably a hydrocarbonmonolithium initiator, and the reaction product then introduced into the polymerization reaction zone as the initiator itself. These initiators also can have other usefulness in conjugated diene homo- and copolymerizations.

In preparing such novel initiators, the range of hydrocarbon lithium compound to polyalkoxy monovinyl substituted aromatic compound can vary widely, depending on the particular results desired, degree of functionality desired, and the like. Presently, I prefer a ratio of about 0.00035:1 to 3.5:1, more preferred about 0.3:1 to 1.4:1 weight ratio of hydrocarbon lithium compound to polyalkoxy monovinylsubstituted aromatic compound.

The polymerization process suitably and preferably is conducted in the presence of a diluent. Any of the diluents known suitable for polymerization of monomers described with the described types of organolithium initiators can be employed. Typical of these are the aliphatic and cycloaliphatic hydrocarbons, as well as the aromatic hydrocarbons, such as n-heptane, 2,2,4-trimethylpentane, cyclohexane, n-hexane, benzene, toluene, the xylenes, and the like, alone or in admixture. Presently preferred are the aliphatic or cycloaliphatic hydrocarbons.

The polymerization reaction can be carried out under autogeneous pressure or at any suitable pressure sufficient to maintain the reaction mixture substantially in the liquid phase. Pressures employed will depend to some extent upon the particular diluents employed, as well as temperatures at which the polymerizations are to be carried out. If desired, higher pressures can be employed, being effected by any convenient means such as pressurization with an inert gas such as nitrogen.

Polymerizations can be conducted over a broad temperature range. Exemplary are temperatures of about −20° to 215° F., presently preferred about 85° to 160° F.

Various materials are known to be detrimental to the catalyst employed in preparing the polymers according to this invention. These materials include carbon dioxide, oxygen, and water. It is usually desirable, therefore, that the reactants and catalysts be freed of these materials as well as other materials which may tend to inactivate the catalyst. Furthermore, it is desirable to remove air and moisture from the reaction vessel in which the polymerization is to be conducted.

Upon completion of the polymerization, the polymerization mixture can be treated to inactivate the catalyst and to recover the rubbery polymer. A suitable means for accomplishing this result involves steam stripping the diluent from the polymer. In another suitable method, a catalyst-inactivating material, such as an alcohol, is added to the mixture so as to inactivate the catalyst and cause precipitation of the polymer. The polymer can then be separated from the alcohol and diluent by any suitable means, such as decantation or filtration. It has been found to be advantageous to add an antioxidant, such as 2,6-di-t-butyl-4-methylphenol, to the polymer solution prior to recovery of the polymer.

EXAMPLES

Examples included are designed to assist in an understanding of the scope of my invention. Particular species employed, amounts, relationships, are designed to be illustrative, not limitative, of the reasonable scope of my invention.

EXAMPLE I

Copolymerizations were made employing a polymethoxystyrene, 3,4-dimethoxystyrene, as the combination randomizer-monomer. These polymerizations were made in accordance with the following recipe:

| Recipe | phm[a] |
|---|---|
| Butadiene | 75 |
| Styrene | 25 |
| Cyclohexane | 760 |
| 3,4-Dimethoxystyrene (DMS) | variable |
| Tetrahydrofuran (THF) | variable |
| n-Butyllithium | 0.096 |
| Polymerization temperature, °F. | 158 |
| Polymerization time, hrs. | 1 |

[a]parts by weight per 100 parts of monomer.
Charge Order: Cyclohexane, nitrogen purge, butadiene, styrene, THF, DMS, butyllithium.

The reactors were tumbled in a constant temperature bath for 1 hour at 158° F. Following polymerization, one part by weight per 100 parts of monomer of 2,6-di-t-butyl-4-methylphenol was added in the form of a solution in 50:50 volume toluene:isopropyl alcohol. Polymers then were coagulated by adding the inactivated polymerization solutions to isopropyl alcohol. Polymers were collected by filtration, and dried at reduced pressure. Polymers produced were rubbery in character. Results obtained are shown in Table I.

Table I

| Run No. | DMS phm | THF phm | Conversion wt. % | Gel[b] wt. % | ML-4[c] at 212° F. |
|---|---|---|---|---|---|
| 1 | 0 | 0 | 96.8 | 0 | 86 |
| 2 | 0.5 | 0 | 98.3 | 0 | 24.5 |
| 3 | 1.0 | 0 | 89.2 | 0 | 44[d] |
| 4 | 1.5 | 0 | 64.3 | 0 | — |
| 5 | 2.0 | 0 | 42.5 | — | — |
| 6 | 0 | 1.5 | 100 | 0 | 11 |

| Run No. | Inherent Viscosity[e] | Trans[f] wt. % | Vinyl[f] wt. % | Styrene[g] wt. % | Block Styrene[h] wt. % |
|---|---|---|---|---|---|
| 1 | 1.08 | 48.1 | 8.6 | 25.3 | 18.9 |
| 2 | 1.35 | 31.4 | 41.2 | 24.8 | 0 |
| 3 | 1.49 | 28.4 | 49.1 | 25.0 | 0 |
| 4 | 1.53 | — | — | 24.9 | 0 |
| 5 | — | — | — | — | — |
| 6 | 1.14 | 40.7 | 29.6 | 25.6 | 0 |

[b]Gel content determined in accordance with U.S. Pat. No. 3,278,508, column 20, note b.
[c]ML-4 at 212° F.:Mooney viscosity determined in accordance with ASTM D 1646-63.
[d]Dash denotes a determination was not made.
[e] Inherent viscosity determined in THF by the process of U.S. Pat. No. 3,278,508, column 20, note a.
[f]Trans and vinyl content determined by infrared absorption spectroscopy.
[g]Styrene content determined by ultraviolet light absorption spectroscopy.
[h]Block styrene content determined by oxidative degradation based on the method of Koltoff, I. M., Lee, T. S., and Carr, C. W., 1 J. Poly. Sci., 429 (1946).

According to the data above, the runs indicate that as the quantity of the 3,4-dimethoxystyrene is increased, the block styrene values show that effective randomization occurs at levels of 3,4-dimethoxystyrene sufficiently low that conversion itself was not adversely affected.

EXAMPLE II

Additional runs were made employing the recipe and methods of polymerization and workup as described in Example I above. Results of these runs are shown in Table II:

Table II

| Run No. | DMS phm | THF phm | Conversion wt. % | Gel % | ML-4 at 212°F. |
|---|---|---|---|---|---|
| 7 | 0 | 0 | 99.1 | 0 | — |
| 8 | 0.2 | 0 | 99.7 | 0 | 44.5 |
| 9 | 0.4 | 0 | 98.0 | 0 | — |
| 10 | 0.6 | 0 | 97.4 | 0 | 32.5 |
| 11 | 0.8 | 0 | 94.5 | 0 | — |
| 12 | 1.0 | 0 | 91.2 | 0 | 40.5 |
| 13 | 0 | 1.5 | 98.0 | 0 | — |

| Run No. | Inherent Viscosity | Oxygen[i] wt. % | Styrene wt. % | Block Styrene wt. % |
|---|---|---|---|---|
| 7 | 1.10 | 0.03 | 23.9 | 17.6 |
| 8 | 1.24 | — | 25.0 | 2.5 |
| 9 | 1.27 | 0.11 | 25.2 | 0 |
| 10 | 0.88 | — | 25.6 | 0 |
| 11 | 1.41 | 0.15 | 25.3 | 0 |
| 12 | 1.46 | — | 25.0 | 0 |
| 13 | 1.13 | 0.04 | 25.6 | 0 |

[i]Oxygen determined by activation analysis.

The above runs indicate that the oxygen content of the copolymer product rises progressively with increasing usage of 3,4-dimethoxystyrene, indicating clearly incorporation of the randomizer into the copolymer product itself. Examination of the copolymer has indicated that such incorporation is chemical, that 3,4-dimethoxystyrene is functioning as a monomer, and that such incorporation is not physical. This was determined by deliberately adding 3,4-dimethoxystyrene monomer itself to a polymer-containing mixture after polymerization, but prior to polymer isolation, and then determining by oxygen analysis that the polymer isolation procedure removed any and all of the added physically present 3,4-dimethoxystyrene. Run 13 above, employing tetrahydrofuran, a known randomizing agent, a polar ether compound, as an effective randomizer, clearly discloses by oxygen analysis no incorporation of THF into the product.

Runs above clearly demonstrate that the block styrene in the copolymer can be effectively eliminated yet without deleterious effect upon conversion.

EXAMPLE III

Further runs were made, employing parallel conditions, to contrast the performance as randomizer-monomer compounds of a monomethoxystyrene, 4-methoxystyrene, with a randomizer according to my invention, the polymethoxystyrenes, as typified by 3,4-dimethoxystyrene. These runs were made in accordance with the following recipe:

Recipe

|  | phm |
|---|---|
| Butadiene | 75 |
| Styrene | 25 |
| Cyclohexane | 760 |
| 3,4-Dimethoxystyrene | variable |
| 4-Methoxystyrene (4-MS) | variable |
| n-Butyllithium | 0.096 |
| Polymerization temperature, °F. | 158 |
| Polymerization time, hrs. | 1 |

Charge Order: Polymerization, workup, otherwise were in accordance with the runs of Examples I.

Results are shown in Table III below:

Table III

| Run No. | 4-MS phm | DMS phm | Conversion wt. % | Gel wt. % | ML-4 at 212°F. |
|---|---|---|---|---|---|
| 14 | 0 | 0 | 98.1 | 0 | 82 |
| 15 | 0.2 | 0 | 100 | 0 | 88 |
| 16 | 0.4 | 0 | 100 | 0 | 88 |
| 17 | 0.8 | 0 | 100 | 0 | 89 |
| 18 | 0 | 0.2 | 98.4 | 0 | 54 |
| 19 | 0 | 0.4 | 96.1 | 0 | 48 |
| 20 | 0 | 0.8 | 88.9 | 0 | 66 |

| Run No. | Inherent Viscosity | Trans wt. % | Vinyl wt. % | Styrene wt. % | Block Styrene wt. % |
|---|---|---|---|---|---|
| 14 | 1.28 | 48.5 | 8.8 | 24.9 | 20.6 |
| 15 | 1.30 | 47.2 | 8.8 | 25.0 | 19.5 |
| 16 | 1.34 | 47.9 | 8.9 | 24.7 | 19.2 |
| 17 | 1.36 | 49.3 | 9.2 | 25.0 | 19.2 |
| 18 | 1.58 | 41.0 | 32.2 | 23.6 | 1.3 |
| 19 | 1.68 | 34.5 | 40.8 | 23.5 | 0 |
| 20 | 1.95 | 30.6 | 50.3 | 23.1 | 0 |

Data above indicated that monomethoxystyrene is not effective as a randomizer. Only the polymethoxystyrenes are effective as randomizers.

The rubbery polymers produced in accordance with this invention have utility in applications where synthetic and natural rubbers are used. The polymers can be compounded by any of the known methods as have been used in the past for compounding rubbers. Compounding ingredients, such as fillers, dyes, pigments, curing or crosslinking agents, softeners, reinforcing agents, and the like, can be used in the compounding operation. In manufacturing finished articles, the rubber polymers can be molded or extruded. They can be advantageously employed in the manufacture of items such as automobile tires, gaskets, containers, pipes, and the like.

Reasonable variations and modifications are possible within the scope of the foregoing disclosure and the appended claims to the invention.

I claim:

1. A polymerization process which comprises contacting at least one polymerizable conjugated diene and at least one polymerizable monovinyl-substituted aromatic hydrocarbon with an effective amount of an organolithium initiator under polymerization conditions including effective temperature and pressure in the presence of a polyalkoxy monovinyl-substituted aromatic compound randomizer, wherein said polyalkoxy monovinyl-substituted aromatic compound is characterized by at least two adjacent alkoxy groups on a benzene ring nucleus, and wherein said randomizer is employed in quantity effective to promote the formation of random copolymers between said conjugated diene and said monovinyl-substituted aromatic hydrocarbon.

2. The polymeric product produced by the process of claim 1.

3. The process according to claim 1 wherein said polyalkoxy monovinyl-substituted aromatic hydrocarbon can be represented by

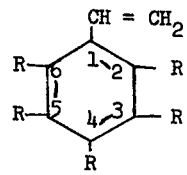

wherein each R is hydrogen, alkoxy —OR', hydrocarbyl, or halogen, such that at least two R groups are OR' and are adjacent, wherein R' is an alkyl radical, R groups where hydrocarbyl are alkyl, cycloalkyl, aryl, wherein two adjacent R groups together with the corresponding carbons of the aromatic nucleus can be a 5 to 10 membered ring system, wherein said halogen is fluorine or chlorine.

4. The process according to claim 3 wherein the total number of carbon atoms in said polyalkoxy monovinyl-substituted aromatic hydrocarbon is 10 to 20.

5. The process according to claim 4 wherein said polyalkoxy monovinyl-substituted aromatic compound randomizer is 3,4-dimethoxystyrene, 3,4-diethoxy-5-methylstyrene, 3,4-dimethoxy-5-cyclohexylstyrene, 3,4-dimethoxy-5-(1,3-dimethylbutyl)styrene, 3,4-di-(n-propoxy)-5-fluorostyrene, 3-vinyl-5,6-dimethoxybiphenyl, 1-vinyl-3,4-dimethoxy-5-ethyl-6-chloro-7-fluoronaphthalene, 3,4,5-triethoxystyrene, pentamethoxystyrene, 3,4-dimethoxy-5-(p-tolyl)styrene, or mixture.

6. The process according to claim 1 wherein said conjugated diene contains 4 to 12 carbon atoms per molecule; said monovinyl-substituted aromatic hydrocarbon contains 8 to 20 carbon atoms per molecule; and the weight ratio of said conjugated diene to said monovinyl-substituted aromatic hydrocarbon is in the range of about 5:95 to 95:5.

7. The process according to claim 6 wherein said conjugated diene is 1,3-butadiene, isoprene, 2,3-dimethyl-1,3-butadiene, piperylene, 3-butyl-1,3-octadiene, 2-phenyl-1,3-butadiene, or mixture, and said monovinyl-substituted aromatic hydrocarbon is styrene, 1-vinylnaphthalene, 2-vinylnaphthalene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, or mixture.

8. The process according to claim 6 wherein said polyalkoxy monovinyl-substituted aromatic compound randomizer is employed in said polymerization process in amounts sufficient to provide from about 0.01 to 10 parts by weight per 100 parts by weight of monomer.

9. The process according to claim 8 wherein said organolithium initiator is a hydrocarbyllithium initiator which can be represented by the formula $R''Li_x$ wherein $R''$ is a hydrocarbon radical, and $x$ is an integer of 1 to 4, inclusive.

10. The process according to claim 9 wherein said $R''$ is aliphatic, cycloaliphatic, aromatic, or combination radical of up to 20 carbon atoms per radical.

11. The process according to claim 10 wherein said organolithium initiator is methyllithium, isopropyllithium, butyllithium, t-octyllithium, n-decyllithium, phenyllithium, naphthyllithium, 4-butylphenyllithium, p-tolyllithium, 4-phenylbutyllithium, cyclohexllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2,-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, or 1,2,3,5-tetralithio-4-hexylanthracene.

12. The process according to claim 9 wherein said polymerization process is conducted in the presence of a hydrocarbon diluent, and wherein said polymerization conditions include a pressure sufficient to maintain the reactants and diluents substantially in the liquid phase, a polymerization temperature in the range of about −20° to 215° F., and wherein is employed about 0.01 to 1 part by weight organolithium initiator to 100 parts by weight total monomer excluding randomizer.

13. The process according to claim 12 wherein said conjugated diene is butadiene, said monovinyl-substituted aromatic hydrocarbon is styrene.

14. The process according to claim 13 wherein said polyalkoxy monovinyl-substituted aromatic hydrocarbon is 3,4-dimethoxystyrene.

15. The process according to claim 14 wherein said organolithium initiator is n-butyllithium.

16. The process according to claim 1 wherein said randomizer and said organolithium initiator are admixed prior to contacting said monomers.

17. Copolymers of conjugated dienes and monovinyl-substituted aromatic hydrocarbons prepared by the process comprising polymerizing at least one said conjugated diene and at least one said monovinyl-substituted aromatic hydrocarbon under effective polymerization conditions including temperature and pressure and employing an effective amount of a hydrocarbon lithium initiator in the presence of at least one polyalkoxy monovinyl-substituted aromatic compound in a quantity sufficient to promote the formation of random copolymers between said conjugated diene and said monovinyl-substituted aromatic hydrocarbon, wherein said polyalkoxy monovinyl-substituted aromatic compound is characterized by at least two alkoxy groups positioned ortho to each other on a benzene ring nucleus.

18. The copolymers according to claim 17 wherein said polyalkoxy monovinyl-substituted aromatic hydrocarbon is represented by

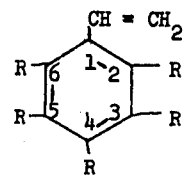

wherein each R is hydrogen, alkoxyl, —OR', hydrocarbyl, or halogen, such that at least two R groups are OR', wherein R' is an alkyl radical, R groups where hydrocarbon are alkyl, cycloalkyl, aryl, wherein two adjacent R groups together with the corresponding carbons of the aromatic nucleus can be a 3 to 8 membered ring system, wherein said halogen is fluorine or chlorine.

19. The copolymers according to claim 18 wherein the total number of carbon atoms in said polyalkoxy monovinyl-substituted aromatic hydrocarbon is from 10 to 20.

20. The copolymers according to claim 19 wherein said polyalkoxy monovinyl-substituted aromatic compound randomizer is 3,4-dimethoxystyrene, 3,4-diethoxy-5-methylstyrene, 3,4-dimethoxy-5-cyclohexylstyrene, 3,4-dimethoxy-5-(1,3-dimethylbutyl)styrene, 3,4-di-(n-propoxy)-5-fluorostyrene, 3-vinyl-5,6-dimethoxybiphenyl, 1-vinyl-3,4-dimethoxy-5-ethyl-6-chloro-7-fluoronaphthalene, 3,4,5-triethoxystyrene, pentamethoxystyrene, 3,4-dimethoxy-5-(p-tolyl)styrene, or mixture.

21. The copolymers according to claim 18 wherein said polyalkoxy monovinyl-substituted aromatic compound randomizer is employed in said polymerization process in amounts sufficient to provide from aout 0.01 to 10 parts by weight per 100 parts by weight of monomer.

22. The copolymers according to claim 21 wherein said conjugated diene contains 4 to 12 carbon atoms per molecule; said monovinyl-substituted aromatic hydrocarbon contains 8 to 20 carbon atoms per molecule; and the weight ratio of said conjugated diene to said monovinyl-substituted aromatic hydrocarbon is in the range of about 5:95 to 95:5.

23. The copolymers according to claim 22 wherein said conjugated diene is 1,3-butadiene, isoprene, 2,3-dimethyl-1,3-butadiene, piperylene, 3-butyl-1,3-octadiene, 2-phenyl-1,3-butadiene, or mixture, and said monovinyl-substituted aromatic hydrocarbon is styrene, 1-vinylnaphthalene, 2-vinylnaphthalene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, or mixture.

24. The copolymers according to claim 22 wherein said organolithium initiator is a hydrocarbon lithium initiator which can be represented by the formula $R''Li_x$ wherein $R''$ is a hydrocarbon radical, and $x$ is an integer of 1 to 4, inclusive.

25. The copolymers according to claim 24 wherein said $R''$ is aliphatic, cycloaliphatic, aromatic, or combination radical of up to 20 carbon atoms per radical.

26. The copolymers according to claim 25 wherein said organolithium initiator is methyllithium, isopropyllithium, butyllithium, t-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, or 1,2,3,5-tetralithio-4-hexylanthracene.

27. The copolymers according to claim 24 wherein said polymerization conditions include polymerization in the presence of a hydrocarbon diluent, a pressure sufficient to maintain the reactants and diluents substantially in the liquid phase, a polymerization temperature in the range of about −20° to 215° F., and employment of said hydrocarbon lithium initiator in the range of about 0.01 to 1 part by weight per 100 parts by weight total monomer other than randomizer.

28. The method according to claim 27 wherein said conjugated diene is butadiene, said monovinyl-substituted aromatic hydrocarbon is styrene, and said polyalkoxy monovinyl-substituted aromatic hydrocarbon is 3,4-dimethoxystyrene.

29. The method according to claim 28 wherein said organolithium initiator is n-butyllithium.

30. A polymerization process which comprises contacting at least one polymerizable monomer which is at least one polymerizable conjugated diene, or at least one polymerizable conjugated diene and at least one copolymerizable monovinyl-substituted aromatic hydrocarbon, under polymerization conditions, with the organolithium initiator prepared by the process comprising contacting at least one hydrocarbon lithium compound with at least one polyalkoxy monovinyl-substituted aromatic compound in a ratio effective to result in said initiator, wherein said hydrocarbon lithium compound is represented by R''Li$_x$ wherein R'' is a hydrocarbon radical containing up to 20 carbon atoms per molecule, x is an integer of 1 to 4, inclusive, said polyalkoxy monovinyl-substituted aromatic hydrocarbon is represented by

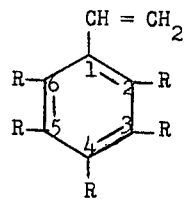

wherein each R is hydrogen, alkoxy —OR', hydrocarbyl, or halogen, such that at least two R groups are OR' and are adjacent the benzene ring, R' is an alkyl radical, R groups where hydrocarbyl are alkyl, cycloalkyl, or aryl, and wherein two adjacent R groups together with the corresponding carbons of the benzene ring can be a 5 to 10 membered ring system, said halogen is fluorine or chlorine, and wherein said polyalkoxy monovinyl-substituted aromatic hydrocarbon contains 10 to 20 carbon atoms per molecule, and wherein said polymerization conditions include a temperature, pressure, and amount of said organolithium initiator effective for said polymerization process to produce a polymer of said conjugated diene, or copolymer of said conjugated diene with said monovinyl-substituted aromatic hydrocarbon.

31. The process according to claim 30 wherein is employed a ratio of said hydrocarbon lithium compound to said polyalkoxy monovinyl-substituted aromatic compound in the range of about 0.00035:1 to 3.5:1, and wherein said polymerization process is conducted at a temperature in the range of about −20° F. to 215° F., in the presence of a hydrocarbon diluent, and under a pressure sufficient to maintain reactants and diluents substantially in the liquid phase, and wherein said organolithium initiator is employed in amounts sufficient to provide about 0.01 to 1 part by weight initiator per 100 parts by weight total monomer.

32. The polymerization process according to claim 31 wherein said conjugated diene contains 4 to 12 carbon atoms per molecule, and said monovinyl-substituted aromatic hydrocarbon contains 8 to 20 carbon atoms per molecule.

33. The polymerization process according to claim 32 wherein said polymerizable monomer is butadiene, or butadiene and styrene.

34. The polymerization process according to claim 33 wherein said hydrocarbon lithium compound is n-butyllithium, and said polyalkoxy monovinyl-substituted aromatic compound is 3,4-dimethoxystyrene.

35. The process according to claim 31 wherein is employed a ratio of said hydrocarbon lithium compound to said polyalkoxy monovinyl-substituted aromatic compound of about 0.3:1 to 1.4:1 in a weight ratio, and wherein said polyalkoxy monovinyl-substituted hydrocarbon is a polymethoxy monovinyl-substituted aromatic hydrocarbon.

* * * * *

UNITED STATES PATENT AND TRADEMARK OFFICE
CERTIFICATE OF CORRECTION

PATENT NO. : 3,931,107
DATED : January 6, 1976
INVENTOR(S) : William J. Trepka

It is certified that error appears in the above—identified patent and that said Letters Patent are hereby corrected as shown below:

Column 9, claim 11, line 19, change "cyclohexllithium" to --- cyclohexyllithium ---; and Column 10, claim 24, line 58, delete "R'λ", line 59, delete " 'Li$_x$ " and insert --- R"Li$_x$ ---.

*Signed and Sealed this*

*twenty-second* Day of *June 1976*

[SEAL]

Attest:

RUTH C. MASON
Attesting Officer

C. MARSHALL DANN
Commissioner of Patents and Trademarks